June 16, 1942. J. T. JANETTE Re. 22,116

SEAL FOR SHAFTS

Original Filed July 21, 1937

Inventor
John T. Janette
By Glenn S. Noble
Atty.

Reissued June 16, 1942 Re. 22,116

UNITED STATES PATENT OFFICE 22,116

SEAL FOR SHAFTS

John T. Janette, Kenilworth, Ill., assignor to Janette Manufacturing Company, Chicago, Ill., a corporation of Illinois Original No. 2,185,554, dated January 2, 1940, Serial No. 154,837, July 21, 1937. Application for reissue December 23, 1941, Serial No. 424,172

6 Claims. (Cl. 286—7)

This invention relates to means coacting with shafts and their bearings for making a tight closure to prevent leakage of oil or fluid out through the bearing. It is particularly directed to a seal or closure wherein a relatively stationary member or non-rotating member has a ground joint or fit with the rotating member and means provided for supporting the non-rotating member to hold it in operative position while permitting full-floating or universal movement and preventing the passage of oil around the same.

The principal object of the invention is to provide an improved oil seal or seal for shafts having novel means for yieldingly supporting one of the sealing members whereby it may be held tightly against a shoulder or the like on the shaft and will be permitted to have a universal movement so that a tight closure is maintained between these coacting parts while at the same time oil or fluid is prevented from escaping through the space around said member; to provide an oil seal having a sealing ring of substantially circular cross section interposed between a relatively fixed member and a sealing member and serving to support the sealing member and prevent passage of oil or the like between said members; to provide a seal for shafts including a ground joint between the shaft and a non-rotating member, and means for yieldingly supporting said non-rotating member and holding it against the shaft while preventing passage of fluid around the same; and to provide such other novel features in construction and advantages in operation as will appear hereinafter.

In the accompanying drawing illustrating this invention,

Figure 1:
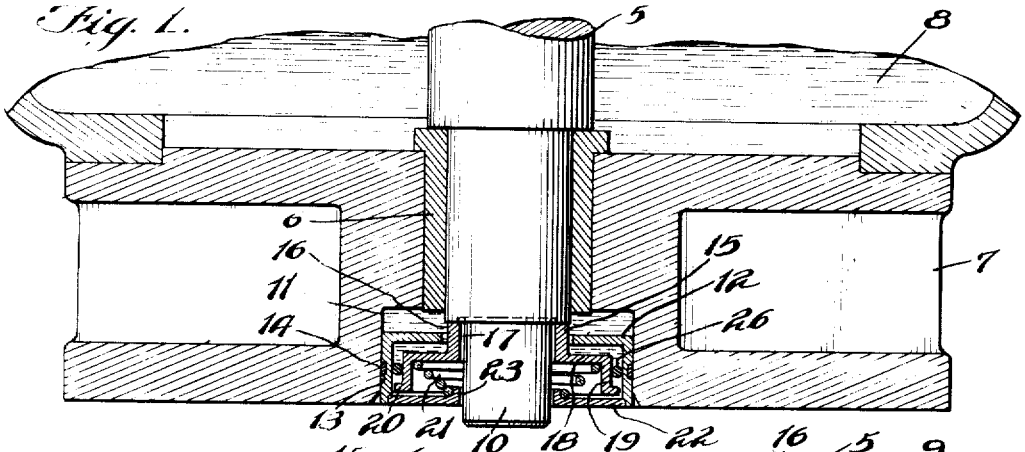
Figure 1 is a sectional view of a shaft having a bearing in a housing, as for instance a housing of a reduction gearing, but illustrative of any apparatus where an oil seal or shaft seal is needed.

As shown in this drawing, the shaft 5 engages with a bearing 6 in a housing 7 representing the frame portion of a machine or the like, as for instance a gear housing in which oil or lubricant 8 is utilized for lubricating the bearing. The shaft 5 is provided with an annular projection or sealing member as for instance a shoulder 9 formed by turning down the end of the shaft as clearly shown at 10 in Figure 2.

The housing has an annular recess 11 surrounding the reduced end 10 of the shaft. A cup or holding member 12 fits closely within the recess and in order to make a fluid-tight joint may have a peripheral groove 13 for receiving a packing ring 14 which may be made of rubber or other suitable yielding material. The arrangement is such that the ring is normally of slightly larger diameter than the inside of the recess so that when the cup or holding member is forced or fitted in place, the packing ring will make a tight closure between the cup and the adjacent wall and prevent leakage in the event of any inequalities in the surface of the cup.

A sealing member or ring 15 is positioned within the cup 12 and has a cylindrical portion 16 which extends through the bottom of the cup with its end engaging with the shoulder 9 to form a sealing joint which is preferably ground to make a tight fit and the entire member is preferably hardened and ground. A clearance as indicated at 17 is preferably provided between the ring or collar and the shaft so that the end of the collar will at all times have free engagement with the shoulder or annular projection on the shaft. The sealing member 15 also has an outwardly extending flange portion 18 which connects with another cylindrical portion 19 having an outwardly extending flange or shoulder 20 at the end thereof. The flange 18 provides a seat for a spring 21 which is preferably of the spiral or conical type as shown. The opposite end of the spring engages with a disc or cap 22 which is secured in the outer end of the cup in any desired manner as by pressed fit or by flanging the cup over the edge thereof. The disc has a central opening for the shaft and is provided with a flange or inwardly extending projection 23 for centering the end of the spring 21.

Figure 2:
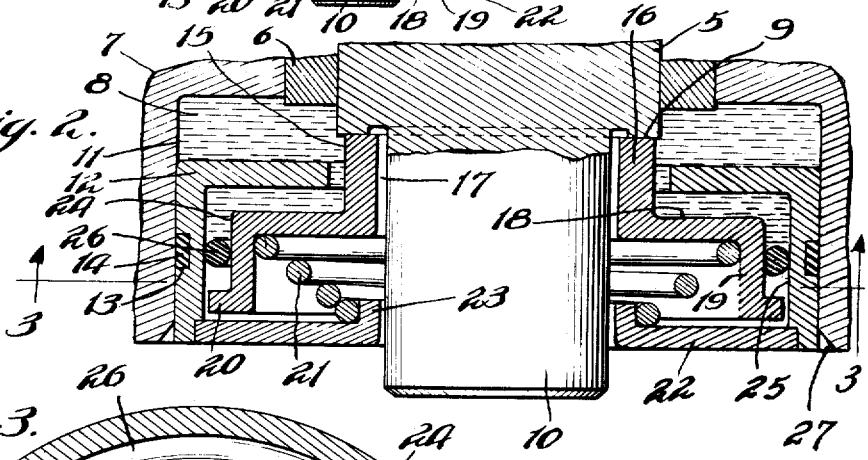
Figure 2 is an enlarged sectional detail of the sealing means.
Figure 3:
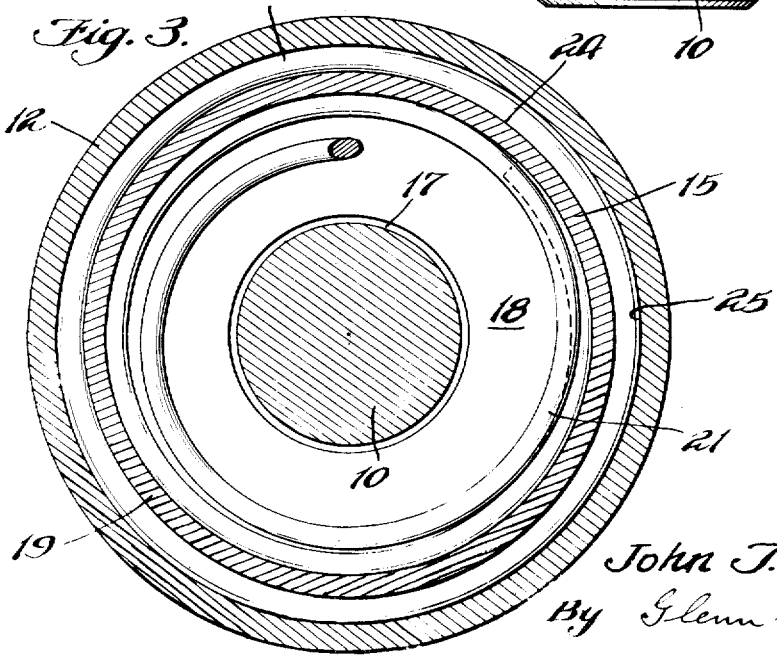
Figure 3 is a cross sectional view taken on the line 3—3 of Figure 2.

As shown particularly in Figure 2, the outer cylindrical surface 24 of the sealing member 15 is oppositely disposed to the inner cylindrical surface 25 of the cup 12 and one of the particularly novel features of the invention is the provision of a relatively narrow sealing ring or yielding gasket member 26 which is preferably substantially circular in cross section and which fits between and closely engages with these opposed surfaces. This ring may be made of any suitable material but preferably such as will not be affected by the oil or liquid to be retained by the seal. For instance it may be made of rubber or rubber composition or preferably of a synthetic resilient material such as commonly known as synthetic rubber or the like.

When the parts are to be assembled the ring 26 is pressed along the cylindrical surface until it engages with the flange or shoulder 20. The sealing member 15 is then inserted in the cup with the ring 26 tightly pressing against the surfaces 24 and 25 and the spring 21 and washer 22 placed in position and the end of the cup spun over or otherwise manipulated to hold the disc 22 in position. When these parts are thus assembled the cylindrical portion 16 will extend at a substantial distance beyond the end of the cup. The cup or holding member with the parts thus mounted therein is then pushed into the socket or recess 11, the outer wall of which is preferably beveled as shown at 27 for convenience in inserting the same. When the cup is inserted to its full distance the end of the cylindrical portion 16 will have engaged with the shoulder 9 and pressed the sealing member 15 slightly back into the cup but without making contact therewith. During this backward or outward movement of the sealing member when the cup is shoved into position, the ring 26 rolls as a circular vortex or vortex ring and moves forward on the cylindrical surface 24 and away from the shoulder 20. When the parts have reached this position, substantially as shown in Figure 2, the ring has a tendency to hold them resiliently in such position and also to maintain the sealing collar 15 in a substantially floating position or so that it may have a universal movement with respect to the cup which permits the inner or contact end 16 to be pressed against the shoulder 9 and make a tight joint regardless of more or less inequalities in the surface of the contact members and also variation in the longitudinal or radial movement of the shaft. The disc or washer 22 serves as an abutment for one end of the spring 21 which tends to press the sealing member 15 tightly against the shoulder 9 and this being a ground joint will prevent the escape of the oil or fluid from around the shaft through such joint. Any oil or fluid passing around the shaft into the recess 11 will be trapped therein or held against passing out between the cup and the sealing member, by the resilient ring 26 which thus serves both as a closure and as a universal support or bearing for resiliently supporting the sealing member or collar 15.

From this description it will be seen that I provide a shaft seal or oil seal having relatively few parts and which may be readily installed for sealing various types of shafts. I have found that my improved seal causes comparatively little friction and therefore tends to prevent heat and to save power, thus being particularly advantageous over leather seals or seals of other types heretofore frequently used. In some of such types it has been proposed to provide certain sealing elements including springs mounted on the shaft and rotatable therewith. In various types of machines, pumps, compressors, or other apparatus requiring such sealing means, the shafts are rotated at relatively high speeds, as for instance from one thousand R. P. M. to three thousand R. P. M. or more. These machines are usually required to be delicately balanced, or balanced with sufficient precision so as to prevent undue vibration or knocking at such speeds. I have found that when sealing mechanisms of the type last mentioned are attempted to be used, various of the parts comprising the seal, and particularly the spring, will become eccentric with respect to the center of the shaft, thus causing unequal loading or throwing the same out of balance and producing a tendency to shake or vibrate the machines. My seal contains no rotating parts and consequently avoids any possibility of parts getting out of balance and will avoid such shaking or vibration as above described. Furthermore all of the parts comprising my improved seal may be assembled to provide a substantially self-contained mechanism that may be shoved into position in the housing so that the end of the sealing member 15 comes in running contact with the shoulder 9 on the shaft. The spring 21 will effectively prevent the rotation of the sealing member 15 and any tendency toward rotation will be further prevented by the resilient sealing ring 26 which coacts with a fixed part of relatively greater diameter than the cylindrical portion 16. On account of the seal being made as a complete unit, they may be made in large quantities and then sold to be applied to various machines as desired.

While I have shown a preferred form of my invention, it will be apparent that changes may be made in the details of construction or in the arrangement of the parts in order to adapt the same for different shafts or different machines or apparatus, and therefore I do not wish to be limited to the particular construction shown and described except as specified in the following claims, in which I claim:

1. Sealing means for rotating shafts, comprising a cup adapted to be mounted in the housing supporting the shaft and making a tight closure therewith, an annular sealing member mounted in said cup which is of substantially larger bore than the diameter of the shaft to which it is to be applied and having one end projecting through the cup for engagement with an abutment on the shaft to make a tight joint, a disc secured in the outer portion of the cup, a spring interposed between the disc and the sealing member, tending to urge the sealing member toward the abutment on the shaft, and a relatively narrow sealing ring between the cup and the sealing member which tends to hold the sealing member centrally disposed in the cup and also makes a tight closure between the cup and the sealing member to prevent oil from passing between the same.

2. In combination, a housing enclosing a fluid reservoir and having a bearing therein, a shaft rotatably mounted in the bearing, said housing having an annular recess around the shaft, a cylindrical member fitting in said recess, a packing ring between said cylindrical member and the wall of the recess, a projection on said shaft, a sealing member having a cylindrical portion, one end of which has a ground joint with said projection, said sealing member having a flange connecting said cylindrical portion with an enlarged cylindrical portion, an annular projection on the end of the enlarged cylindrical portion, a ring formed of resilient material of substantially circular cross section fitting between the last named cylindrical portion and the first named cylinder and adapted to move as a vortex ring therebetween, a disc secured in the outer portion of the first named cylinder, and a spring between the disc and the flange of said sealing member tending to press the sealing member against the projection on the shaft, the arrangement being such that said sealing member will be freely supported and will have a universal movement whereby the ground joint will be effectively maintained between the same and the projection on the shaft.

3. Sealing apparatus for use with a rotatable shaft comprising a cup having a central hole through the bottom thereof, a disc secured in the open end of the cup, a packing ring mounted in the outer surface of the cup, a sealing member having a cylindrical portion projecting through the opening in the cup and adapted to have the end thereof engage with a portion of the shaft to make a tight joint, said sealing member having an outwardly projecting flange connecting said cylindrical portion with a larger cylindrical portion within the cup, resilient means positioned between the flange and the disc tending to move the sealing member away from the disc, the last named cylindrical portion of the sealing member having an annular projection at the end thereof, and a resilient vortex ring between the last named cylindrical portion and the inner wall of the cup, said ring being normally positioned against said annular projection when the parts are assembled, the arrangement being such that the sealing member will be retracted in the cup when pressed into sealing engagement with the shaft member and the ring will be rotated as a vortex ring a short distance away from said projection whereby the ring will be free to support the sealing member yieldingly within the cup so that it may have a universal movement which will permit the contact portion to maintain a tight joint with the shaft.

4. A self-contained sealing means for cooperation with a rotatable shaft having an annular projection thereon, and a housing in which the shaft is mounted, comprising a cup to be fitted in a recess in the housing around the shaft and making a tight closure with the wall of the recess, a sealing member positioned within the cup and having a cylindrical portion of larger internal diameter than the diameter of the shaft, extending through a central opening in the bottom of the cup and adapted to engage with the projection on the shaft to make a tight joint therewith, a disc secured in the outer end of the cup, a spring interposed between the disc and the sealing member and tending to hold the end of the cylindrical portion against the projection on the shaft, and a relatively narrow ring formed of resilient material fitted between the sealing member and the inner wall of the cup, said ring serving to hold the sealing member centrally disposed in the cup and also serving to make a tight closure between the cup and the sealing member.

5. A self-contained sealing means for cooperation with a rotatable shaft having an annular projection thereon, and a housing in which the shaft is mounted, comprising a cup to be fitted in a recess in the housing around the shaft and making a tight closure with the wall of the recess, a sealing member positioned within the cup and having a cylindrical portion of larger internal diameter than the diameter of the shaft, extending through the open end of the cup and adapted to engage with the projection on the shaft to make a tight joint therewith, spring means interposed between the bottom of the cup and the sealing member and tending to hold the end of the cylindrical portion against the projection on the shaft, and a relatively narrow ring formed of resilient material fitted between the sealing member and the inner wall of the cup, and having substantially line contact with the sealing member and the walls of the cup, said ring serving to hold the sealing member centrally disposed in the cup and also serving to make a tight closure between the cup and the sealing member.

6. The combination with a housing, of a shaft mounted therein and having an annular projection, said housing having a recess around the shaft, a cylindrical member fitting in said recess and making a tight closure with the wall thereof, a sealing member positioned within the cylindrical member and having a larger internal diameter than the diameter of the shaft and extending through the end of the cylindrical member and engaging with the projection on the shaft, spring means coacting with the cylindrical member and the sealing member tending to hold the end of the sealing member against the projection on the shaft, and a yielding gasket member which is substantially circular in cross-section fitted between the sealing member and the inner wall of the cylindrical member, said gasket member serving to hold the sealing member centrally disposed in the cylindrical member and also serving to make a tight closure between the cylindrical member and the sealing member while permitting substantially universal movement of the sealing member with respect to the projection on the shaft.

JOHN T. JANETTE.